Figure 1:
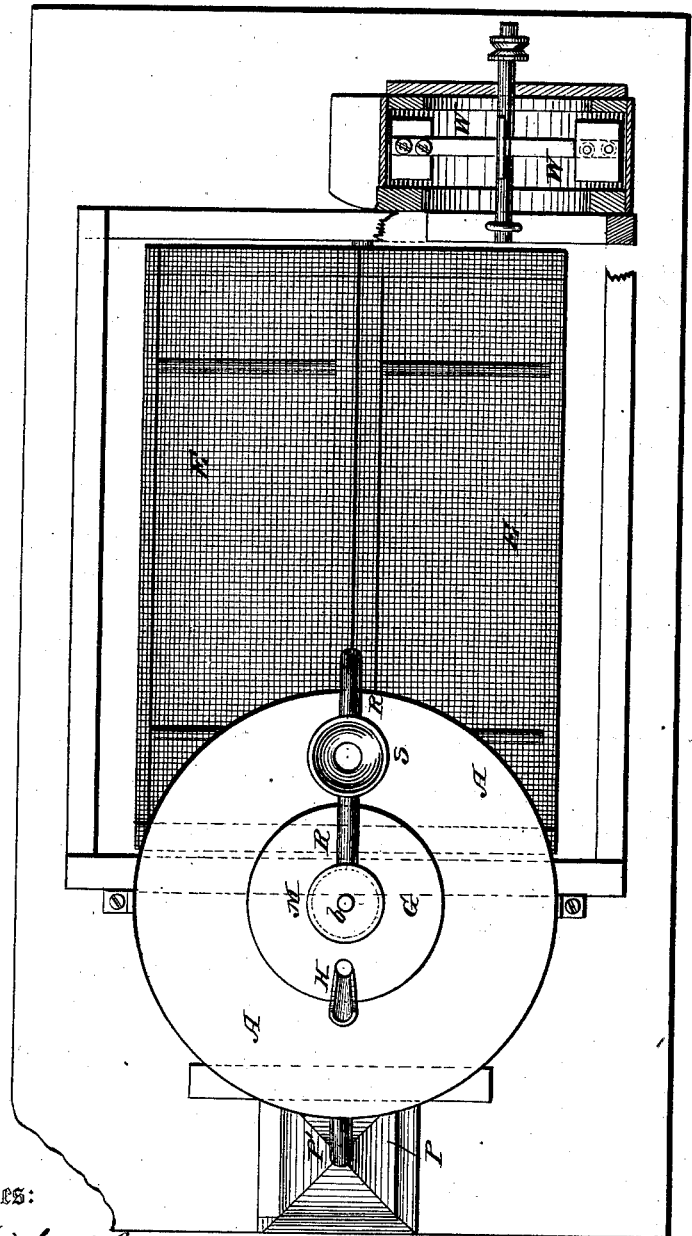

2 Sheets—Sheet 1.

M. TOULMIN.
Grain Scourer and Cleaner.

No. 216,240. Patented June 3, 1879.

Witnesses:
P. C. Dietrich
Frank H. Duffy

Inventor
Morton Toulmin
Per C. H. Watson & Co.
Attorneys.

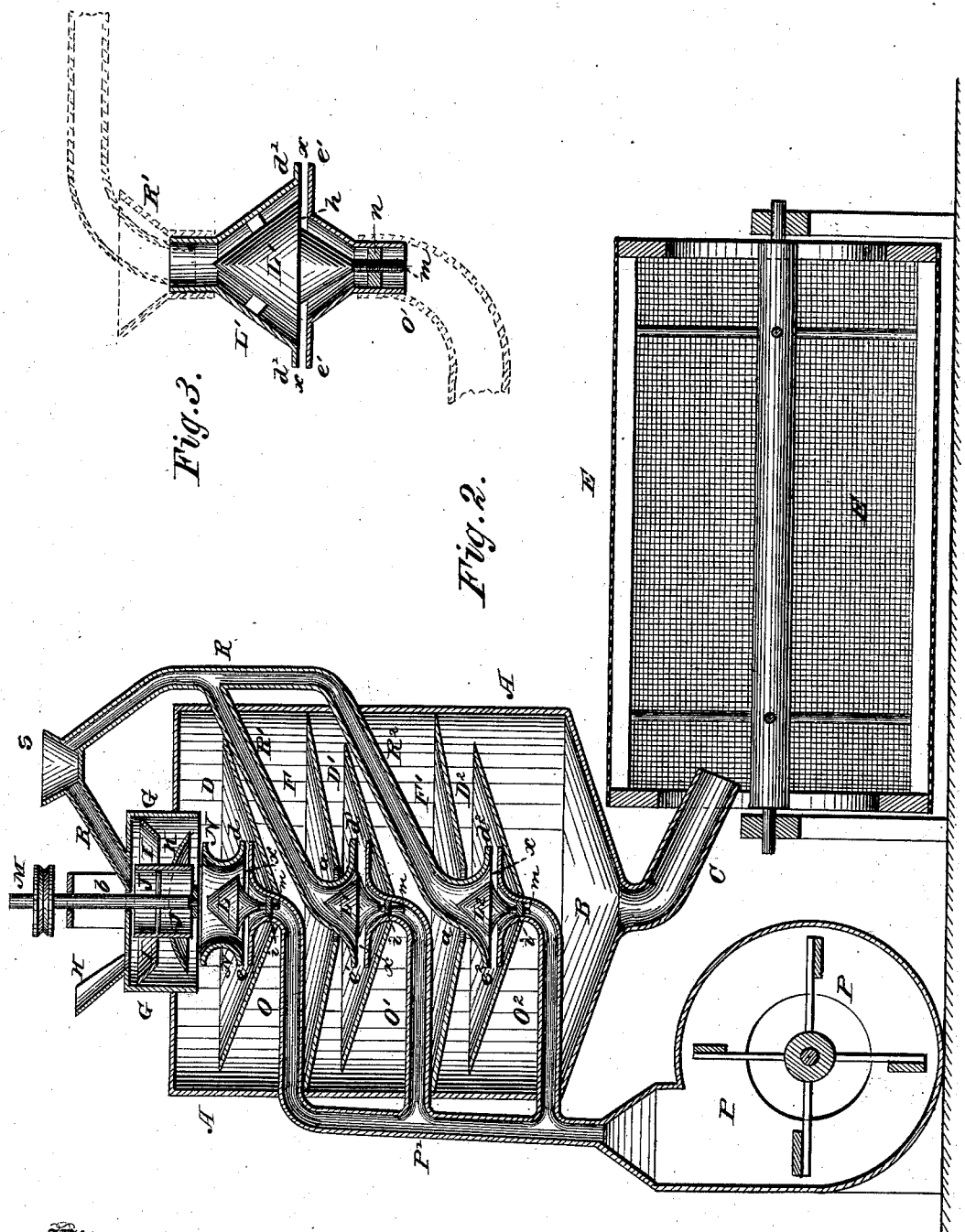

UNITED STATES PATENT OFFICE.

MORTON TOULMIN, OF MOBILE, ALABAMA.

IMPROVEMENT IN GRAIN SCOURER AND CLEANER.

Specification forming part of Letters Patent No. 216,240, dated June 3, 1879; application filed April 9, 1879.

*To all whom it may concern:*

Be it known that I, MORTON TOULMIN, of Mobile, in the county of Mobile and State of Alabama, have invented certain new and useful Improvements in Apparatus for Scouring and Cleaning Grain; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention has relation to means for driving an air and sand blast from the center of one or more shelves outwardly in every direction against an outer column of grain, in such a manner as to clean the outer surface of each grain from all extraneous matter.

My invention consists in the construction and arrangement of a machine in which means, as above indicated, are organized for effective operation, all as hereinafter more fully set forth.

In the annexed drawings, which fully illustrate my invention, Figure 1 is a plan view of my machine. Fig. 2 is a longitudinal vertical section of the same. Fig. 3 is a detailed section of a part thereof.

A represents a cylinder of any suitable dimensions, provided with a concave or funnel-shaped bottom, B, from the center of which leads a spout, C, into a revolving screen, E.

Within the cylinder A is a series of concave or funnel-shaped shelves, $D$ $D^1$ $D^2$, which are arranged one above the other, and of such size as to leave a suitable space between their outer edges and the inside of the cylinder. Between these shelves are placed other shelves, F $F^1$, of similar form, but larger, so as to fit closely to the sides of the cylinder. In the centers of these latter shelves are left openings $a$, as shown.

In the top of the cylinder A is fastened a hopper, G, which is closed at the top, and provided with one or more spouts, H, for the admission of grain into the hopper. Inside the hopper G, at or near the top, is a conical ring-shaped deflecting-plate, I, which directs the grain from the spouts H toward the center. The deflecting-plate I surrounds a central rotating tube, J, to which is attached a second deflecting-plate, K. This plate is concave underneath and convex on its upper face. The tube J is attached in any suitable manner to a vertical shaft, $b$, which is to be rotated by a belt around a pulley, M, on the shaft. Below the tube J is arranged a smaller hopper, N, the upper part of which is of larger diameter than the tube, but of smaller diameter than the deflecting-plate K, as shown. Within the hopper N is placed a double cone, L, which is adjustable up and down, and held stationary by means hereinafter described.

The double cone L is constructed as shown in Fig. 3, forming a shoulder at $h$, surrounding the same, and, as it were, separating the lower smaller cone from the upper larger one. The lower end of the hopper N is spread out to form a horizontal flange, $d$, as shown.

P is a fan, provided with a pipe, P', from which a series of branches, $O$ $O^1$ $O^2$, lead into the cylinder A, and their ends pass up through the centers of the respective shelves $D$ $D^1$ $D^2$, as shown, and within said shelves the ends of the branch pipes form funnels $e$ $e^1$ $e^2$.

S is a hopper to receive sand or similar material, and from this hopper a pipe, R, leads into the hopper G and into or above the tube J, so that the sand will fall down through said tube.

Other pipes, $R^1$ $R^2$, lead into the cylinder A over the shelves $F^1$ $F^2$, and down through the central openings, $a$, therein. The lower ends of these branch pipes are spread, forming inverted funnels $d^1$ $d^2$, corresponding with the funnel-shaped mouths $e^1$ $e^2$ at the ends of the air-pipes $O^1$ $O^2$.

Double cones $L^1$ $L^2$ are arranged, respectively, within the funnels $d^1$ $e^1$ and $d^2$ $e^2$, said double cones being constructed exactly similar to the double cone L, above described.

Each double cone is provided at its lower end with a screw-stem, $m$, which is screwed through a nut, $i$, whereby the cone can be adjusted up and down to regulate the space between the two funnels.

In operation the grain and sand may be elevated and put into the spouts or troughs H and hopper S, respectively, by means of elevators or by any other convenient method.

the grain falling on the revolving concave deflecting-plate K, which causes it to be discharged in a thin circular sheet and drop down on the first shelf, D. The sand dropping through the tube J falls on the cone L, which distributes it so that it may be acted upon by the air-blast, and be driven out with great force through the opening $x$ between the two funnels. The air-blast drives the sand in radiating lines from the center toward the circumference of the circular shelf D, striking the falling grains with considerable force, and driving them over the edges of the shelf D, so that the grains and sand fall down on the shelf F, where it all slides down to the center and goes through the opening $a$, when the grain is again subjected to the action of the sand-blast, and so on as many times as there are devices for that purpose, until the grain and sand finally reach the bottom B of the cylinder, and pass from thence through the spout C into the revolving screen E.

The sand passes through the meshes of the screen, while the grain is discharged at the rear end of the screen. At this point is a fan, W, to drive off the light dust, chaff, &c., which may remain with the grain.

After the grain and sand have been separated, it is obvious that the sand may be used over and over again by a proper system of conveyers and elevators, to convey and elevate it back again to the hopper S.

By my invention I utilize the abrasive action of sand, powdered granite, or quartz, when driven by a blast of air to remove the extranous dirt from wheat, rice, coffee, or other kinds of grain, by driving the blast from the center toward the circumference in radiating lines, in order that the grains may be separated more and more as they approach the periphery of the shelf or shelves, which insures the action of the abrasive material upon every single grain before it falls over the edges of the shelf or shelves.

Having thus fully described my invention, what I claim as new, and desire to secure by Letters Patent, is—

1. In a sand-blast grain-cleaner, the combination of a device for feeding the grain in a tubular column, and a means for forcing the sand outward from the center and through the descending grain, substantially as set forth.

2. The combination of the hopper G, having one or more grain-inlets, H, and sand-inlet R, the stationary deflecting-plate I, and the revolving shaft $b$, with tube J and deflecting-plate K, attached thereto, substantially as and for the purposes herein set forth.

3. The combination of the double adjustable cone L with two surrounding funnels, arranged opposite to each other, and forming a space, $x$, between the funnels around the centers of the cone, substantially as herein set forth.

4. The combination of concave shelf D, double cone L, with two surrounding funnels, and a lower concave shelf, F, with central opening, $a$, substantially as and for the purposes herein set forth.

5. The double cone L, provided with a screw-stem, $m$, in combination with two surrounding funnels and a nut, $i$, substantially as and for the purposes herein set forth.

In testimony that I claim the foregoing as my own I have hereto affixed my signature in presence of two witnesses.

MORTON TOULMIN.

Witnesses:
P. C. DIETERICH,
C. H. WATSON.